United States Patent
Beaupre

(10) Patent No.: US 7,083,718 B2
(45) Date of Patent: Aug. 1, 2006

(54) WATERBOILER SYSTEM WITH SOLIDS REMOVAL APPARATUS

(75) Inventor: Rudolph T. Beaupre, Southwick, MA (US)

(73) Assignee: Clearwater Systems Corp., Essex, CT (US)

( * ) Notice: Subject to any disclaimer, the term of this patent is extended or adjusted under 35 U.S.C. 154(b) by 334 days.

(21) Appl. No.: 10/698,151

(22) Filed: Oct. 31, 2003

(65) Prior Publication Data

US 2005/0092672 A1 May 5, 2005

(51) Int. Cl.
*B01D 21/26* (2006.01)
*B01D 43/00* (2006.01)
*C02F 1/48* (2006.01)

(52) U.S. Cl. ............... 210/138; 210/695; 210/712; 210/787; 210/805; 210/806; 210/181; 210/195.1; 210/222; 210/223; 210/257.1; 210/294; 210/512.1; 210/122; 210/44.1

(58) Field of Classification Search ............... 210/695, 210/138, 181, 222, 223, 512.1, 712, 787, 210/805, 806, 195.1, 257.1, 294; 122/52, 122/240.1, 44.1
See application file for complete search history.

(56) References Cited

U.S. PATENT DOCUMENTS

| | | | | |
|---|---|---|---|---|
| 3,736,907 A | * | 6/1973 | Agrest | 122/240.1 |
| 4,406,794 A | * | 9/1983 | Brigante | 210/695 |
| 5,702,600 A | | 12/1997 | Pandolfo | 210/222 |
| 6,021,819 A | * | 2/2000 | Cannell | 138/177 |
| 6,063,267 A | | 5/2000 | Crewson et al. | 210/143 |

OTHER PUBLICATIONS

Opheim, Dennis J., "The Effect of Pulse-Power Technology on the Microbial Content and Biofilm Formation in Evaporative Cooling Towers", 100th Annual General Meeting of The American Society of Microbiology, May 21-25, 2000, 3 pgs., Los Angeles, CA.

"Non-Chemical Water Conditioning at Schick: A Pollution Prevention Case Study", CT DEP Case Study, 3 pgs., undated.

Method of Action, 3 pgs., undated.

(Continued)

*Primary Examiner*—David A. Reifsnyder
(74) *Attorney, Agent, or Firm*—Michaud-Duffy Group LLP

(57) ABSTRACT

A water boiler system for producing steam or hot water includes an apparatus for removing dissolved minerals from the boiler water without the use of water softeners or other chemical treatment agents. An electromagnetic flux producing device first treats water of the boiler system with alternating electromagnetic flux to cause nucleation of dissolved minerals in the bulk boiler water, rather than on boiler surfaces, with nucleated particles then accumulating into particulates which settle by gravity to a low area of the boiler. Water is continuously drained from the low area of the boiler and fed by a pump to a mechanical separator which continuously separates solids from the drain water and continuously passes cleansed water at a high temperature back to the boiler. In the return of the cleansed water to the boiler, it may be directed at high velocity toward the low area of the boiler to stir the boiler water to inhibit compact settling of the precipitated particles and/or to enhance the heat transfer efficiency of the boiler.

12 Claims, 2 Drawing Sheets

OTHER PUBLICATIONS

"Kinetics of Microbial Inactivation for Alternative Food Processing Technologies Oscillating Magnetic Fields", U.S. Food and Drug Administration Center for Food Safety and Applied Nutrition, Jun. 2, 2000, pp. 1-9.

Encyclopedia of Chemical Technology, fourth edition, Kirk-Othmer, vol. 13, Helium Group to Hynotics, undated.

Costerson, J.W. and Steward, Philip S., "Battling Iofilms", Scientific American, Jul. 2001, pp. 75-81.

"Operation, Installation, and Maintenance on The Dolphin Hytronic Series 1000", Clearwater Technical Manual, Clearwater Systems LLC, Essex, CT 06426, undated.

Hua, Inez: "An Investigation f Homogenous and Heterogeneous Sonochemistry for Destruction of Hazardous Waste", Environmental Management Science Program, Jun. 1, 1998, Project ID No. 54834, Purdue University, pp. 3.

Schwikkard, G.W. et al.: "Design of a Sonochemical Reactor", Pollution Research Group, Department of Chemical Enginnering, pp. 1.

Colic, M. et al.: "Mechanism of the Long-Term Effects of Electromagnetic Radiation on Solutions and Suspended Colloids", Languir 1998, vol. 14, pp. 783-787.

* cited by examiner

WATERBOILER SYSTEM WITH SOLIDS REMOVAL APPARATUS

FIELD OF THE INVENTION

This invention concerns a waterboiler system with apparatus for removing solids from the boiler water for the purpose of conditioning the water without the use of water softeners or other chemical agents to reduce or eliminate the water's tendency to deposit precipitates onto heat transfer surfaces of the boiler system.

BACKGROUND OF THE INVENTION

Precipitation of dissolved solids from water is a result of the water reaching supersaturation, and many dissolved solids become less soluble at higher temperatures. Solids that behave in this manner are referred to as "inversely soluble". The primary force inducing particle precipitation out of solution in water boilers is water temperature. Other parameters that contribute to particle precipitation include water hardness, conductivity, pH, water velocity, and alkalinity. These other parameters play a lesser role in boilers than they do in other systems due to the dramatic temperature increase. Of the many inversely soluble minerals that precipitate out of solution, the first is usually calcium carbonate. In untreated water, the initiation of particle precipitation is nucleation which occurs on surfaces of the boiler internal components, gradually producing an insulating scale that greatly reduces boiler efficiency.

To reduce or eliminate the build up of scale on boiler surfaces, a common practice is to treat the boiler water with water softeners to reduce the tendency for mineral precipitation and/or with other chemical agents to form compounds with increased solubility or other chemical complexes with the minerals dissolved in the boiler water to form precipitates in the boiler water, rather than on the boiler surfaces, which precipitates then settle by gravity to a low point of the boiler structure which then are periodically removed from the boiler, as by a "blowdown" procedure.

Another known way of causing precipitates to occur in the boiler water rather than on the boiler surfaces, is to treat the boiler water with oscillating electromagnetic flux, as for example with use of a device such as described in U.S. Pat. No. 6,063,267, owned by the Assignee of this application, which device is referred to as the "Dolphin" water treatment device and available from the Assignee of this application, namely Clearwater Systems, LLC of Essex, Conn., USA. Such exposure of the boiler water to oscillating electromagnetic flux causes nucleation of dissolved minerals to occur in the boiler water, which nucleation is then followed by an agglomeration of a nucleated particles into more massive and heavy precipitates which again settle by gravity to a low point in the boiler system and can be removed by periodic "blowdown" procedures.

The use of alternating electromagnetic flux for the treatment of boiler water has the advantage over chemical treatment of the water in that expensive chemicals and procedures and apparatus for adding the chemicals to the water are not required. On the other hand, both the chemical treatment and the treatment with a alternating electromagnetic flux have a common disadvantage in that the periodic boiler blowdowns required to remove the settled precipitates from the boiler system release significant amounts of hot water and therefore decrease the boiler efficiency.

A general aim of this invention is therefore to provide an apparatus for use with boiler systems to remove dissolved minerals from the boiler water before they form scale on boiler surfaces, which apparatus does not require the use of water softeners or other chemical agents and which apparatus greatly reduces the number of boiler blowdowns required over a given period of time.

In keeping with the above object, a further general object is to provide a water treatment apparatus for a boiler system which apparatus allows the boiler system to be operated continuously over long periods of time without blowdown and with a reduced need for manual supervision and maintenance.

SUMMARY OF THE INVENTION

The above objects are solved in accordance with the invention in that in an otherwise conventional boiler system, the water in the boiler system is treated by oscillating electromagnetic flux, by a device such as the above-mentioned Dolphin device, with the device preferably being located in the feed water supply line feeding water to the boiler. At the bottom or other low point of the boiler at which precipitated particles accumulate by gravity, water with entrained particles, is removed from the boiler by a pump and supplied under pressure to a mechanical solids separator, such as a centrifuge, to separate the drained water into solids and cleansed water, with the cleansed water flowing continuously from the separator and with the separated particles being collected in a sump of the separator. By means of a timer controlled valve, the collected particles are periodically drained from the separator; and the continuous outflow of cleansed water is returned to the boiler structure while still at a temperature close to that of its temperature at the point of drainage from the boiler.

Further, particularly in the case of the boiler structure being that of a firetube boiler, the cleansed water from the mechanical separator is preferably injected into the boiler as a jet or jets near the bottom of the boiler structure so as to keep the boiler water in the bottom of the boiler structure in a stirred or riled condition inhibiting the settling of the precipitated particles into compact masses which might otherwise become difficult to remove from the boiler.

More particularly, in the use of the apparatus of the invention, agglomerated free floating particles nucleated in the bulk water solution as induced by the electromagnetic flux and which would otherwise become scale are prevented from settling on surfaces or accumulating in low flow areas by providing a pump assisted flow on a continuous basis from the boiler to a mechanical separator that is performance enhanced by the nature of the agglomerated particles and which in turn is periodically drained to produce a concentrated mineral discharge to drain that saves energy by minimizing hot water loss from the system. The continuous flow of cleansed water from the separator is redirected back into the boiler in locations where internal boiler geometry promotes low water flow and enhances particulate settling. Thus, stirring these low flow areas to allow otherwise settled particles to enter the recirculating piping loop including the pump and the mechanical separator.

Other features and advantages of the invention will become apparent from the following detailed description of the preferred embodiments of the invention and from the accompanying drawings.

DETAILED DESCRIPTION OF THE PREFERRED EMBODIMENTS

In the case of conventional boiler systems, bottom blowdown is the method used for solids removal from a boiler. The industry standard procedure for bottom blowdown is to have it almost always operated manually with the involved valves typically being opened for about fifteen seconds every eight hour shift. The standard bottom blowdown frequency varies depending upon the water and operating conditions of the individual boiler. In the use of chemical treatment, where the goal is to keep solids in solution by water softening and other means, this bottom blowdown method is usually sufficient to prevent excessive solids accumulation in the bottom of the boiler.

Figure 1:
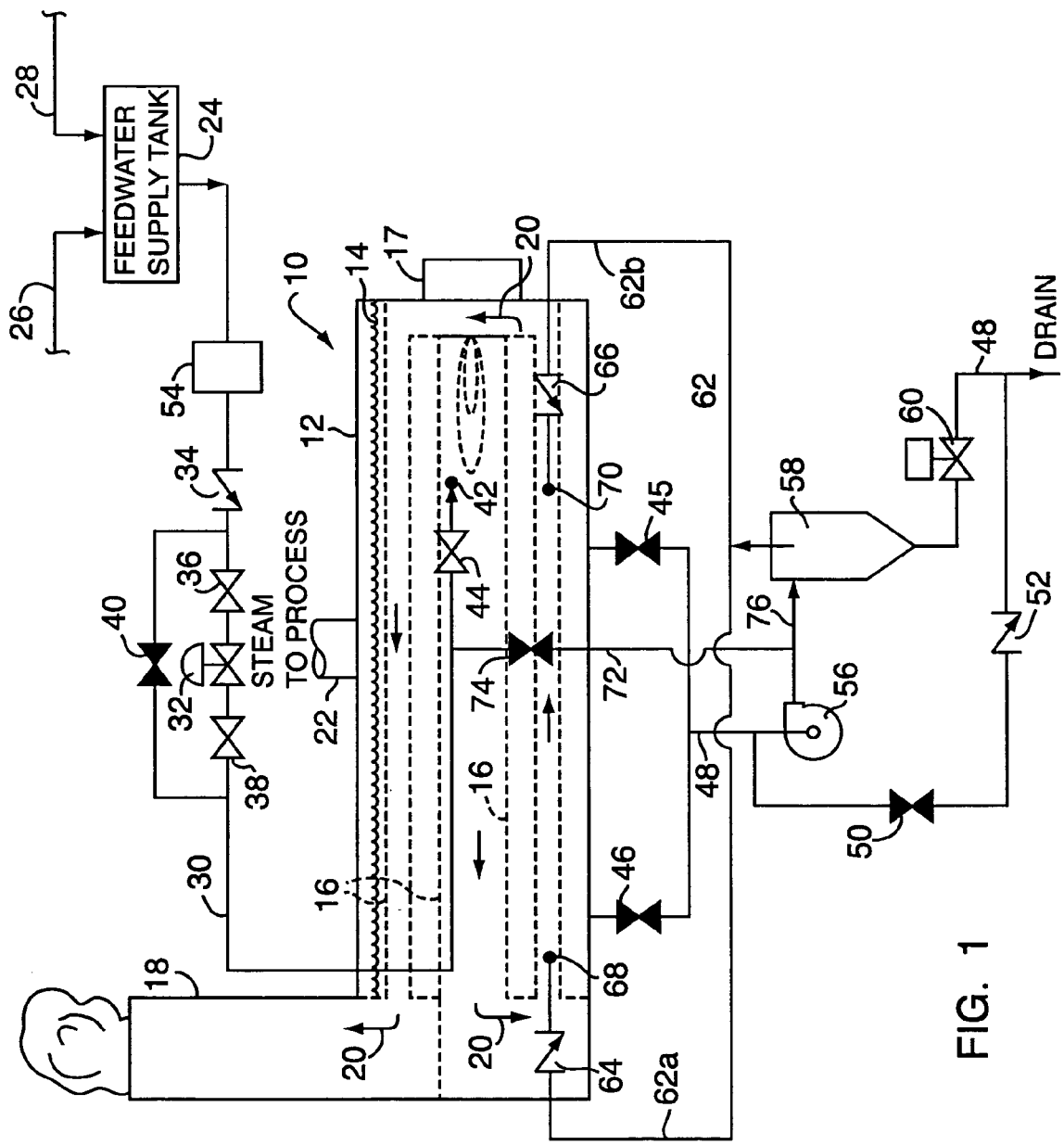
FIG. 1. is a schematic view of a firetube boiler system and boiler water treatment apparatus embodying the invention.

Referring to the drawings, FIG. 1 shows a boiler system embodying the invention wherein the boiler, indicated generally at 10, is that of a conventional firetube boiler 12 with conventional piping which has been modified to adapt it to the present invention. External parts of the system are shown in solid line, and parts inside of the boiler are shown in broken line.

The boiler 12 of FIG. 1 is nearly completely filled with a body of water 14. Inside the boiler 12 are a number of firetubes 16 through which hot gases produced by a burner 17 flow to an exhaust stack 18 as indicated by the arrows 20. The water 14 thus surrounds the firetubes 16 and becomes heated by the hot gases flowing through the firetubes. The boiler shown is taken to be a steam boiler and has an outlet pipe 22 through which steam is removed from the boiler for whatever use to which it is put. It should be understood, however, that in keeping with the invention, the boiler need not be a steam boiler and in some instances may be a boiler for producing hot water in which case hot water rather than steam is removed from the boiler.

The conventional piping associated with the boiler 12 includes a feed water supply tank 24 which contains a supply of feed water and to which water is added by both a return pipe 26 and a raw water pipe 28. Water supplied through the pipe 26 is condensate or other water originally removed as steam or hot water from the boiler through the outlet pipe 22; and the water added by the pipe 28 is raw water to make up for water lost in the use of the steam or hot water passing from the outlet pipe 22.

Water is fed to the boiler 12 from the feed water supply tank 24 through a supply line or conduit 30 through which the flow of the water is controlled by a suitably controlled flow control valve 32 and through a check valve 34. In the illustrated piping system, valves which are normally open are shown in non-solid form and valves which are normally closed are shown in solid form. Valves 36, 38, and 40 are conventional isolation valves provided for maintenance purposes. The water flowing to the boiler through the supply line 30 is shown in FIG. 1 to enter the boiler 12 at the point 42 after passing through open valve 44.

The conventional blowdown piping for the boiler 12 of FIG. 1 includes two normally closed valves 45 and 46 connected in parallel with one another between the bottom of the boiler 12 and a drain line 48, with the drain line including a normally closed valve 50 and a check valve 52. Thus, for a conventional blowdown of the boiler 12, the valve 50 is manually open and then each valve 45 and 46 is individually opened for the required amount of time and then re-shut to remove water with accumulated solids from the boiler.

In keeping with the invention, the conventional boiler system components described above for FIG. 1, which may be taken to be intended for chemical treatment of the water, are modified by adding to the feed water supply line 30 a device 54, which device 54 is preferably one such as shown by U.S. Pat. No. 6,063,267, the content of which is incorporated herein by reference, which applies electromagnetic flux, in the form of repetitive bursts of ringing electromagnetic flux, to the feed water passing through the line 30 to the boiler 12.

The conventional components of the system shown in FIG. 1 are further supplemented by a pump 56 receiving water and solids from the drain line 48, a mechanical separator 58, preferably a centrifuge, receiving water and solids from the pump 56, a timer controlled valve 60 connected between the solids outlet at the bottom end of the separator 58 and the drain line 48, and a return line 62 connected with the upper cleansed water outlet of the separator 58, with the return line 62 having two parallel branches which supply the cleansed water from the separator 58 through two check valves 64 and 66 respectively to two inlet points 68 and 70 of the boiler, with the inlet points 68 and 70 preferably being so located as shown in the bottom portion of the boiler 12 that the cleansed water enters the boiler bottom at relatively high jet like velocities to maintain the water in the bottom of the boiler 12 in a stirred condition to inhibit compacting of solid particulates which might otherwise impede the drainage of the solids through the drain line 48.

Having described the components of the system shown in FIG. 1, it's operation may be further described as follows. The separator 58 is designed to centrifugally separate solids from the drain water and its operating effectiveness (in terms of size and percentage of particles captured) is closely related to the pressure drop through the separator. The pressure drop through the separator (about 9 psig) is controlled by mass flow through the separator. Thus, the size and operating design parameters of the separator dictates the size of the pump 56 to be used. The standard separator size to be used is expected to be between 100–200 gpn. The pump further is one, which has the necessary seals, and is otherwise designed, to withstand the relatively high operating temperatures of the handled water. With the existing manual blowdown valve 50 closed and valves 45 and 46 open, the illustrated system is allowed to operate continuously as solids accumulate in the bottom of the separator 58 and clean water is continuously sent back to the boiler through the top of the separator and the two branches of the return line 62. The timer controlled valve 60 connected to the solids discharge bottom end of the separator 58 opens for about five seconds every day (depending upon water conditions and solids accumulation) to flush the separated solids from the separator. Cleansed water exiting the top of the separator 58 is directed to the front and rear bottom portions of the boiler 12 by the two branches 62a, 62b of the return line 62. Partition walls inside the boiler at these locations can be used to promote solids accumulation and the continuous flow of cleansed water to these areas helps to keep the solids stirred up. A nozzle or adductor arrangement at each of the points of the discharge of the cleansed water from the two branches 62a and 62b of the return line may be used to further promote the stirring effect.

The system shown in FIG. 1 also includes an alternate line 72 extending from the feed line 30 through a valve 74 to the line 76 connecting the pump 56 to the separator 54. With the valve of the system conditioned as shown in FIG. 1, the feed water moving through the supply line 30 is added to the water 14 already in the boiler by passing through the open valve 44 and by entering the boiler at the point 42. As an alternative to this, the feed water can instead be added to the water supplied to the separator 58, as can be achieved in FIG. 1 by closing the valve 44 and opening the valve 74. The benefits of this are twofold: first, the nucleation of particles precipitating out of solution would occur prior to reaching the separator 58. This would remove some quantity of solids before they ever enter the boiler 12 and would thereby reduce the potential for solids accumulation in the boiler. Second, the combination of water streams from the pump 56 and the boiler feed water line 30 increases the overall flow to the separator providing additional pressure drop across it if needed. This can be important because separators sometimes fail to achieve the necessary pressure drop to operate at maximum effectiveness.

Figure 2:
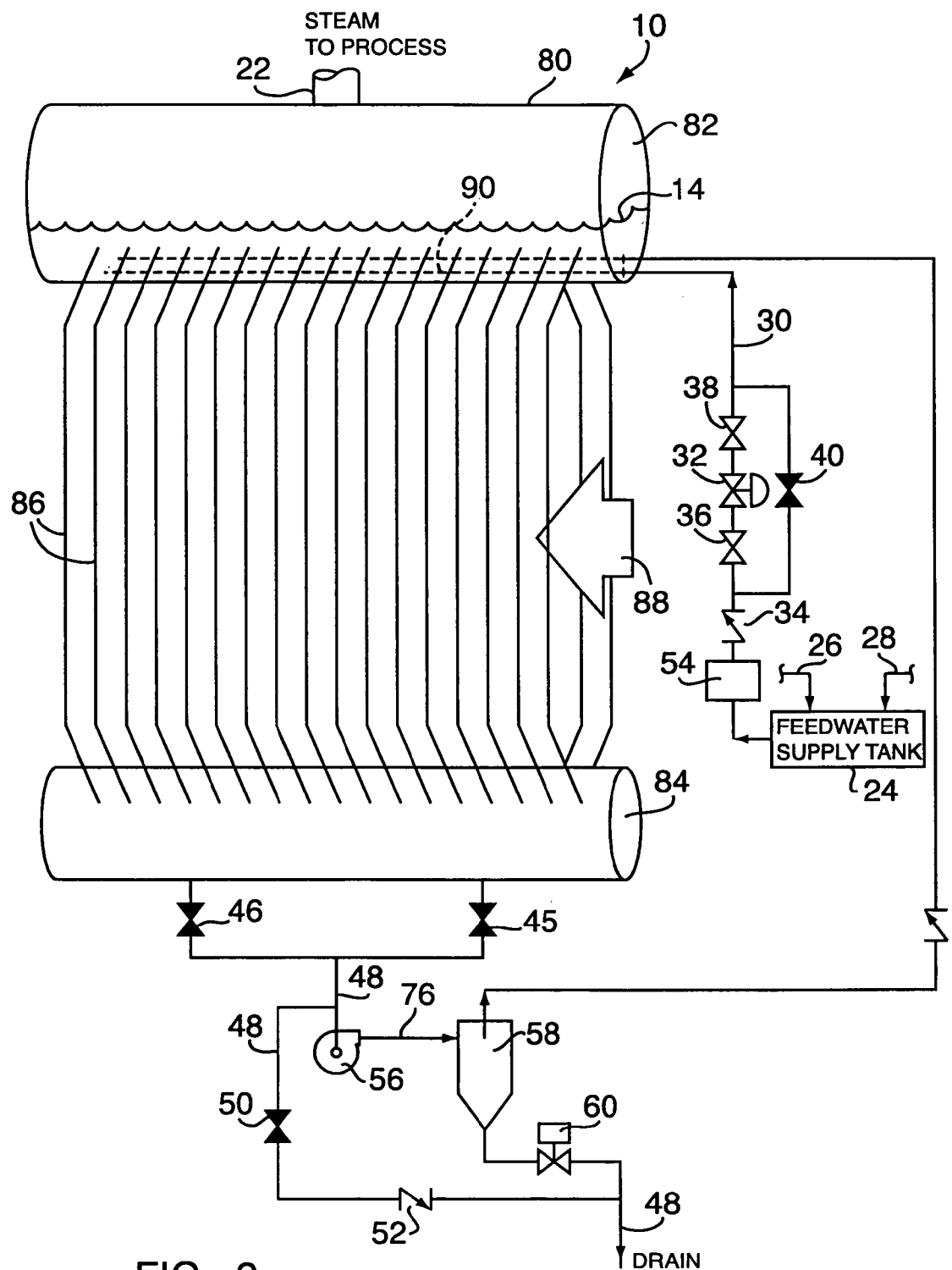
FIG. 2 is a schematic view of a watertube boiler system and boiler water treatment apparatus comprising another embodiment of the invention.

FIG. 2 shows a boiler system embodying the invention which embodiment is in many ways similar to that shown in FIG. 1 except for the boiler comprising a watertube boiler 80 instead of the firetube boiler 12. Parts of the FIG. 2 system which are similar to those of the FIG. 1 system in FIG. 2 have been given the same reference numbers as in FIG. 1 and need not be redescribed.

The watertube boiler of FIG. 2 has an upper steam drum 82 and a lower mud drum 84 collectively containing the body of water 14 and connected to one another by generally vertically extending watertubes 86 which are so arranged that heated gases from the associated burner (not shown) as indicated by the arrow 88 pass over the watertubes 86 and supply heat to the water contained in the tubes.

In the case of the system shown in FIG. 2, the water from the feed water supply line 30 enters the steam drum 82 through what may be an existing chemical feed pipe 90, which is converted to this function since the use of chemicals has been eliminated by the use of the electromagnetic treatment device 54. This pipe 90 typically has holes running its length to evenly disperse the supply water into the steam drum 82. Because a certain amount of subcooling is required to promote natural circulation (the result of water density variations in different generating banks of watertubes 86 as a result of differences in the amount of heat picked up by various tubes) and to minimize bubble entrainment in the downcomer tubes of the tube bank (downcomer tubes are ones wherein the water flow is downward, as opposed to riser tubes where the flow of water is upward), the relatively cold feed water preferably enters the steam drum 82 and not the mud drum 84. Water in the mud drum 84 is cooler than the water in the steam drum 82, and the recirculated water from the mud drum may assist in the subcooling. Since the industry standard design location for feed water entering the boiler is being maintained, there is no swirling effect to dislodge accumulated deposits in the mud drum of the watertube boiler 80. However, water velocities in a watertube boiler are usually much greater than in a firetube boiler so that in a case of a watertube boiler, the potential benefit of swirling the water in the bottom of the mud drum 84 would not be as significant as in the firetube boiler. Also in FIG. 2 the illustrated system differs from that of FIG. 1 in that the option provided in FIG. 1 of directing the feed water to the separator 58 rather than to the body of water 14 in the boiler, as made possible by the line 72 and valve 74 of FIG. 1, is not included in the system of FIG. 2. This alternate possibility is not shown in FIG. 2 since it could possibly effect the steam drum subcooling if the feed water temperature were to be significantly increased prior to entering the steam drum 82.

In summary, in systems embodying the invention an electromagnetic flux water treatment device is used to promote the precipitation of solids from the boiler water and a mechanical apparatus is used to supplement the removal of the precipitated solids to prevent their accumulating through gravitational settling into the lower areas of the steam boilers and/or hot water boilers. This mechanical apparatus is a centrifugal separator/pump system installed as an addition to the existing piping previously designed for intermittent operation and solids removal, with the added components providing a continuous flushing and removal of solids, thereby allowing mineral loading incurred through the use of the electromagnetic flux device to be managed without the need for water softeners or other chemical agents. This is accomplished by adding a pump assisted recirculating loop from the existing periodic flushing, or blowdown, system through a mechanical separator and back into the boiler. The continuous flow of water from the from the bottom flush of the boiler, or blowdown, allows the solids to accumulate in the separator while the "cleaned" water is reverted back to the boiler. The separator is then periodically flushed to remove a much denser concentration of solids from the boiler than previously capable, thus allowing for much less hot water to be disposed down the drain, resulting in energy savings. The agglomerated nature of particle formation induced by the electromagnetic flux water treatment device further enhances the effectiveness of the separator and subsequent removal of particulate matter from the boiler, in addition to allowing for the aforementioned elimination of water softening chemicals and equipment. Also, the continuous nature of the water directed into the boiler that might otherwise only experience periodic inflows of water allows this recirculated water to be injected into the boiler in such a manner that it promotes dispersion of solids that otherwise would be allowed to settle in low flow areas. A secondary effect of the system may be to provide continuous water movement in the boiler, such that heat transfer effectiveness would increase and the boiler would be more responsive to variations in load demand, as well as reducing the time necessary to bring the boiler on line from a cold start. The system of the invention is particularly viable to augment the water treatment provided by an electromagnetic flux treatment device such as that shown in U.S. Pat. No. 6,063,267 that produces particle nucleation sites to produce free floating precipitated particles and subsequent benign water properties associated with equilibrium of non-chemically treated water.

An apparatus particularly useful is disclosed in U.S. Pat. No. 6,063,267 which describes the apparatus for treating liquid with electromagnetic flux, one or more coils surrounding a liquid conducting pipe are excited by a switching circuit including a triode switch turned on and off in response to the voltage applied to the coil or coils in such a way that during each operative half cycle of the supply voltage a current is conducted through the coils during an initial portion of the half cycle and then at a substantial time before the end of the half cycle, the switch is turned to an open condition causing the current built up in the coils to be taken up by a series resonant circuit, formed by the inductance of the coil or coils art associated given capacitance and the power supply, to produce a ringing current in and a ringing voltage across each coil and consequent ringing electromagnetic flux in the liquid passing through the pipe. The apparatus may have either a half wave or full wave mode of operation. When two or more coils are used, preferably the fluxes produced by at least two of the coils move in opposite directions through the liquid.

Basic benefits of a boiler system in accordance with the invention are:

1. Eliminates water softening requirements while effectively removing the particles induced to precipitate in the bulk solution before they grow large enough to settle.
2. Takes advantage of the particle agglomerating principles of operating of the electromagnetic flux treatment device to make the mechanical separator more effective in removing the boiler solids.
3. Minimizes the effects of particulate settling in low flow areas of the boiler.
4. Reduces the amount of hot blowdown water to drain in order to increase boiler heat rate.
5. In the case of firetube boilers, provides an option for creating an alternative nucleation site by having the initial feed water temperature occur at the separator inlet as opposed to the boiler inlet, thus preventing many precipitated solids from ever entering the boiler.
6. In the case of a firetube boiler, increases the boiler responsiveness to load changes by providing greater forced convention and therefore higher heat transfer rates and lower boiler tube metal temperatures and stresses.
7. In the case of a watertube boiler, enhances steam drum water temperature uniformity through better mixing—this providing smaller water density differentials in the watertube bank and thereby lower tube metal temperature and stresses.

The invention claimed is:

1. A water boiler system for producing an output of hot water or steam, said system comprising:
    a boiler for containing a body of water to be heated having an upper portion and a bottom portion;
    a heating means for heating the body of water in the boiler;
    an outlet conduit in which hot water or steam evolving from the body of water is dischargeable from the boiler;
    a supply conduit through which supply water is directly or indirectly added to the body of water contained by the boiler;
    a device associated with the supply conduit for exposing supply water passing through the supply conduit to oscillating electromagnetic flux to induce the formation of particulates in the supply water which settle by gravity to the bottom portion of the boiler;
    an outlet for continuously draining water containing the settled particulates from the bottom portion of the boiler;
    a means for continuously centrifugally separating the drained water containing the settled particulates into separated particulates and cleansed water; and
    a means for continuously returning the cleansed water to the boiler.

2. A water boiler system as defined in claim 1, wherein said system further includes a means for periodically purging the separated particulates from the means for continuously centrifugally separating.

3. A water boiler system as defined in claim 2, wherein said means for periodically purging the separated particulates from the means for continuously centrifugally separating includes a timer controlled valve.

4. A water boiler system as defined in claim 1, wherein the cleansed water from the means for continuously centrifugally separating is returned to the bottom portion of the boiler.

5. A water boiler system as defined ion claim 1, wherein said water boiler includes firetubes.

6. A water boiler system as defined in claim 5, wherein said cleansed water is returned to the bottom portion of the boiler.

7. A water boiler system as defined in claim 1, wherein said boiler includes watertubes.

8. A water boiler system as defined in claim 7, wherein said boiler includes an upper steam drum and a lower mud drum, and said cleansed water is returned to the steam drum of the watertube boiler.

9. A water boiler system as defined in claim 1, wherein said device for exposing supply water passing through the supply conduit to oscillating electromagnetic flux is one whereby the electromagnetic flux is applied to the supply water in repetitive bursts of ringing electromagnetic flux.

10. A water boiler system as defined in claim 9, wherein said device for exposing the supply water passing through the supply conduit to oscillating electromagnetic flux utilizes two coils wherein fluxes produced by the two coils move in opposite directions through the supply water.

11. A hot water boiler system as defined in claim 1, wherein the supply conduit is designed to add the supply water directly to the body of water contained by the boiler.

12. A water boiler system as defined in claim 1, wherein the supply conduit is designed to add the supply water directly to the means for continuously centrifugally separating the drained water containing the settled particulates.

* * * * *